J. KRAMER & B. BOKE.
HORSE-POWERS.

No. 193,820.  Patented Aug. 7, 1877.

Witnesses:
I. J. Masson
D. P. Cool

Inventors
John Kramer,
and
Bernard Boke.
by E. E. Masson
atty.

UNITED STATES PATENT OFFICE.

JOHN KRAMER AND BERNARD BOKE, OF MARIA STEIN, OHIO.

IMPROVEMENT IN HORSE-POWERS.

Specification forming part of Letters Patent No. 193,820, dated August 7, 1877; application filed July 2, 1877.

*To all whom it may concern:*

Be it known that we, JOHN KRAMER and BERNARD BOKE, both of Maria Stein, in the county of Mercer and State of Ohio, have invented certain new and useful Improvements in Horse-Powers; and that the following is a full, clear, and exact description of the same, reference being had to the accompanying drawings, making a part of this specification, in which—

Figure 1:
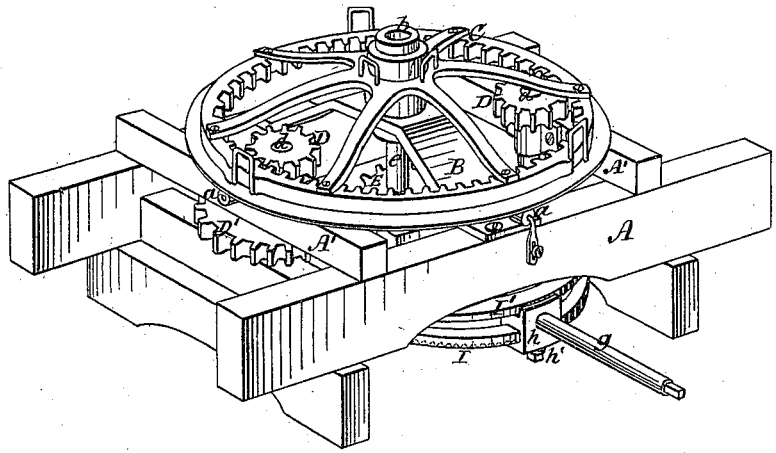
Figure 2:
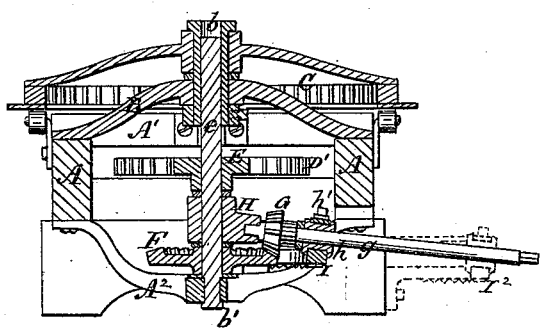
Figure 3:
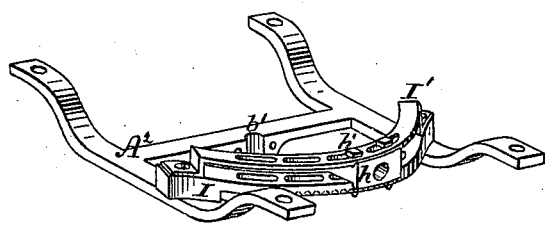

Figure 1 represents a perspective view of the improved horse-power. Fig. 2 represents a vertical section of the same. Fig. 3 represents details of the tumbling-shaft bearing, clamping device, and guide-support.

Farmers using a horse-power to accomplish much work by connecting it to different machines to thrash grain, saw wood, pump water, &c., lose much time in having to remove or turn it around to connect it in as direct a line as possible with the machine intended to use, as the horse-power has to be anchored securely each time before using it.

The object of our invention is to remove this difficulty by retaining the horse-power anchored in the same place, (if not mounted,) and simply turning the first tumbling-shaft so that it will point in the direction of the machine to be used, and thus reduce the friction upon the joints of the tumbling-rods.

Our invention consists in the mode of fastening the first tumbling-rod sliding journal-box to a half-circular guide-frame constructed for the purpose, and other devices more fully described hereinafter.

In the drawings, A represents the side pieces of the frame, made of such size that it can, if desired, be placed upon a wagon and used as a mounted horse-power, or used upon the ground and anchored, in the usual manner. The side pieces are united by cross-pieces $A^1$ and a central cross-piece, B, generally made of metal. This cross-piece carries the master-wheel C, that can revolve freely around a hollow spindle, $b$, passing through the piece B. The master-wheel has internal gear-teeth that gear with two small pinions, D, attached to vertical shafts $d$, passing through boxes fastened to the cross-pieces $A^1$. To the shafts $d$ are attached gear-wheels $D'$, that mesh with a central pinion, E, upon the vertical central shaft $e$. This shaft is retained in position by the hollow spindle $b$, that forms its upper bearing, and by another bearing, $b'$, at its lower end, supported by a metallic frame or brace, $A^2$, attached to the main frame. To the shaft $e$ is fastened a beveled cog-wheel, F, that transmits its motion to a bevel-pinion, G, attached to a shaft, $g$. This shaft can be set either horizontally or inclined, so as to form an angle with a horizontal plane. Its inner end rests in a box or bearing, H, mounted loosely upon the vertical shaft $e$, and resting upon a collar attached to said shaft, or upon the boss of the horizontal bevel-gear F, or upon washers interposed between them. The shaft $g$ is also supported in a sliding box, $h$, resting upon a partly circular guide, I, and retained in place by a similarly-curved guide, $I^1$, the sliding box $h$ being provided with flanges above and under for that purpose. The shaft $e$ being the center of the curve given to the guides I $I^1$, the sliding box $h$ can occupy any desired position upon the arc formed by the guides, where it is retained by a screw-bolt or screw-bolts, $h'$, passing through the box and the two guides, clamping the three securely together. To guard against any shifting of the box $h$ while working, we form the lower guide I of cast-iron, with indentations or V-teeth on its under side, with which similar projections upon the head of the bolt $h'$ can engage securely, the upper guide $I^1$ being preferably made of wrought-iron, and thus the shaft $g$ has a firm support, and in any direction required. Another pair of guides, $I^2$, Fig. 2, can be placed on the outside of the frame, and attached to it so that it can be raised or lowered. The box H can be adjusted in position by means of washers above or under it, and the master-wheel also can be adjusted in the same manner. The latter is retained in place by the head of the hollow spindle $b$, and its rim is supported by travelers $a$, adjustably attached to the frame. The head of the spindle *b* may be made in the form of a collar bolted to said spindle.

Having thus fully described our invention, we claim—

1. In combination with a double-geared horse-power, the adjustable sliding bearing *h*, clamping-bolt *h'*, and circular guides I and I¹, substantially as and for the purpose described.

2. In combination with the vertical central shaft *e* of a double-geared horse-power, the tumbling-shaft *g*, sliding box *h*, and circular guides I I¹, the inner box or bearing H, pivoted to said central shaft, substantially as shown and described.

JOHN KRAMER.
BERNARD BOKE.

Witnesses:
LORENZ LOCHTEFELD,
JOSEPH HOGEDORN.